(12) United States Patent
Ishihara

(10) Patent No.: US 7,515,920 B2
(45) Date of Patent: Apr. 7, 2009

(54) COMMUNICATION TERMINAL UNIT, CELL-SEARCH METHOD, AND PROGRAM

(75) Inventor: Takeshi Ishihara, Tokyo (JP)

(73) Assignee: NEC Corporation, Tokyo (JP)

( * ) Notice: Subject to any disclaimer, the term of this patent is extended or adjusted under 35 U.S.C. 154(b) by 592 days.

(21) Appl. No.: 11/214,139

(22) Filed: Aug. 29, 2005

(65) Prior Publication Data

US 2006/0030271 A1  Feb. 9, 2006

(30) Foreign Application Priority Data

Sep. 8, 2004  (JP) ............................. 2004-260386

(51) Int. Cl.
*H04B 7/00* (2006.01)
(52) U.S. Cl. .................. 455/502; 455/501; 455/503; 455/67.11; 375/368
(58) Field of Classification Search ................ 455/502, 455/501, 503, 67.11
See application file for complete search history.

(56) References Cited

U.S. PATENT DOCUMENTS

| | | | |
|---|---|---|---|
| 5,898,513 A * | 4/1999 | Gist et al. ................... | 398/202 |
| 6,819,927 B1 * | 11/2004 | Sato ........................... | 455/437 |
| 2003/0236079 A1 * | 12/2003 | Hasegawa ................. | 455/160.1 |
| 2006/0013348 A1 * | 1/2006 | Klosters et al. ............. | 375/368 |

FOREIGN PATENT DOCUMENTS

| | | |
|---|---|---|
| EP | 1 283 608 A2 | 2/2003 |
| EP | 1 367 844 A1 | 12/2003 |
| WO | WO 2004/036940 A1 | 4/2004 |

OTHER PUBLICATIONS

Mitchell, Bill, "Variable Bandwidth RSSI Scanning", Motorola Technical Developments (1996), vol. 28, pp. 22-24.
"Universal Mobile Telecommunications System (UMTS); User Equipment (UE) procedures in idle mode and procedures for cell reselection in connected mode (3GPP TS 25.304 version 5.5.0 Release 5)" European Telecommunications Standards Institute (2004), vol. 3-R2, No. V550, pp. 1-42.
3GPP TS 25.304, Chapter 5.1.2.2, Jun. 2004.

* cited by examiner

*Primary Examiner*—Matthew D Anderson
*Assistant Examiner*—Adel Youssef
(74) *Attorney, Agent, or Firm*—Scully, Scott, Murphy & Presser, P.C.

(57) ABSTRACT

In carrying out a cell search, the received-signal level (RSSI) at each frequency is measured in the first place, by implementing asynchronous detection in steps of a predetermined frequency-step width over a predetermined search frequency range (from Fini to Fend), After measuring the RSSI, a cell search is carried out by implementing synchronous-detection processing over the frequency range that has a center frequency where the received-signal level is higher than a threshold value and that has the frequency-step width, it is an object of the present invention to obtain a communication terminal unit that can reduce a cell-search time.

10 Claims, 7 Drawing Sheets

FIG. 5

| FREQUENCY | RSSI |
|---|---|
| F_1 | RSSI_1 |
| F_2 | RSSI_2 |
| F_3 | RSSI_3 |
|  |  |
|  |  |
|  |  |
| F_n | RSSI_n |

FIG. 6

| FREQUENCY | RSCP |
|---|---|
| F_1 | RSCP_1 |
| F_2 | RSCP_2 |
| F_3 | RSCP_3 |
|  |  |
|  |  |
|  |  |
| F_k | RSCP_k |

COMMUNICATION TERMINAL UNIT, CELL-SEARCH METHOD, AND PROGRAM

BACKGROUND OF THE INVENTION

1. Field of the Invention

The present invention relates to a communication terminal unit, a cell-search method, and a program, and more particularly to a communication terminal unit that implements a cell search, while scanning a predetermined search frequency range.

2. Description of the Related Art

According to conventional band-search (cell-search) methods, a mobile terminal as a communication terminal unit implements synchronous detection every channel raster Fr, over an entire band range Fw. Accordingly, the synchronous detection is inevitably implemented with respect to FW/Fr frequencies.

In addition, for example, 3GPP TS 25.304, Chapter 5.1.2.2, June 2004 discloses implementation of a cell search, such as this, while searching over the entire band range.

As described above, according to conventional cell-search methods, synchronous detection is implemented every channel raster Fr, over the entire band range Fw; therefore, the synchronous detection is implemented with respect to FW/Fr frequencies, whereby it takes a long time to implement a cell search. If it takes a long time to implement a cell search, a problem is posed that, when a mobile terminal travels from a region outside the communication range to a region inside the communication range, it takes a long time to implement location registration.

BRIEF SUMMARY OF THE INVENTION

It is an object of the present invention to provide a communication terminal unit, a cell-search method, and a program that can reduce a cell-search time.

A communication terminal unit according to the present invention includes controlling means for implementing a cell search, while scanning a predetermined search frequency range; the communication terminal unit is characterized by that the controlling means measures a received-signal level by implementing asynchronous detection over the predetermined search frequency range and detects a cell, by implementing synchronous detection over a frequency range (referred to as a synchronous-detection frequency range, hereinafter) where it is determined according to a result of the measurement that a desired signal exists.

In the communication terminal unit, the controlling means measures a received-signal level through implementing asynchronous detection in steps of a predetermined frequency step width over the predetermined search frequency range, and makes a frequency range that has a center frequency at which the received-signal level is higher than a threshold value and that has the predetermined frequency step width be the synchronous-detection frequency range.

A cell-search method according to the present invention, for a communication terminal unit that implements a cell search, while scanning a predetermined search frequency range; the cell-search method is characterized by including a first step of measuring a received-signal level, by implementing asynchronous detection over the predetermined search frequency range and a second step of detecting a cell, by implementing synchronous detection over a frequency range (referred to as a synchronous-detection frequency range, hereinafter) where it is determined according to a result of the measurement that a desired signal exists.

The cell-search method is characterized by that, in the first step, a received-signal level is measured, by implementing asynchronous detection in steps of a predetermined frequency step width over the predetermined search frequency range and by that, in the second step, a frequency range that has a center frequency at which the received-signal level is higher than a threshold value and that has the predetermined frequency step width is made to be the synchronous-detection frequency range.

A program according to the present invention makes a computer carry out a cell-search method for a communication terminal unit that implements a cell search, while scanning a predetermined search frequency range; the program is characterized by including a first step of measuring a received-signal level, by implementing asynchronous detection over the predetermined search frequency range and a second step of detecting a cell, by implementing synchronous detection over a frequency range (referred to as a synchronous-detection frequency range, hereinafter) where it is determined according to a result of the measurement that a desired signal exists.

The program is characterized by that, in the first step, a received-signal level is measured, by implementing asynchronous detection in steps of a predetermined frequency step width over the predetermined search frequency range and by that, in the second step, a frequency range that has a center frequency at which the received-signal level is higher than a threshold value and that has the predetermined frequency step width is made to be the synchronous-detection frequency range.

According to the present invention, in carrying out a cell search, a received-signal level at each frequency is measured in the first place, by implementing asynchronous detection in steps of a predetermined frequency-step width over a predetermined search frequency range. Thereafter, a cell is detected by implementing synchronous detection over the frequency range that has a center frequency where the received-signal level is higher than a threshold value and that has the frequency-step width.

According to the present invention, in a communication terminal unit that implements a cell search through scanning a predetermined search frequency range, by measuring a received-signal level by implementing asynchronous detection over the predetermined search frequency range, and by detecting a cell, through implementing synchronous detection over a frequency range where it is determined according to a result of the measurement that a desired signal exists, an effect is obtained that a cell-search time can be reduced.

BRIEF DESCRIPTION OF THE DRAWINGS

FIG. 5 is a table representing an example of an asynchronous-detection detected wave list that is created in accordance with the flowchart in FIG. 3;

FIG. 6 is a table representing an example of a synchronous-detection detected wave list that is created in accordance with the flowchart in FIG. 4.

DETAILED DESCRIPTION OF THE PREFERRED EMBODIMENTS

Embodiments of the present invention will be explained below with reference to the drawings.

Figure 1:
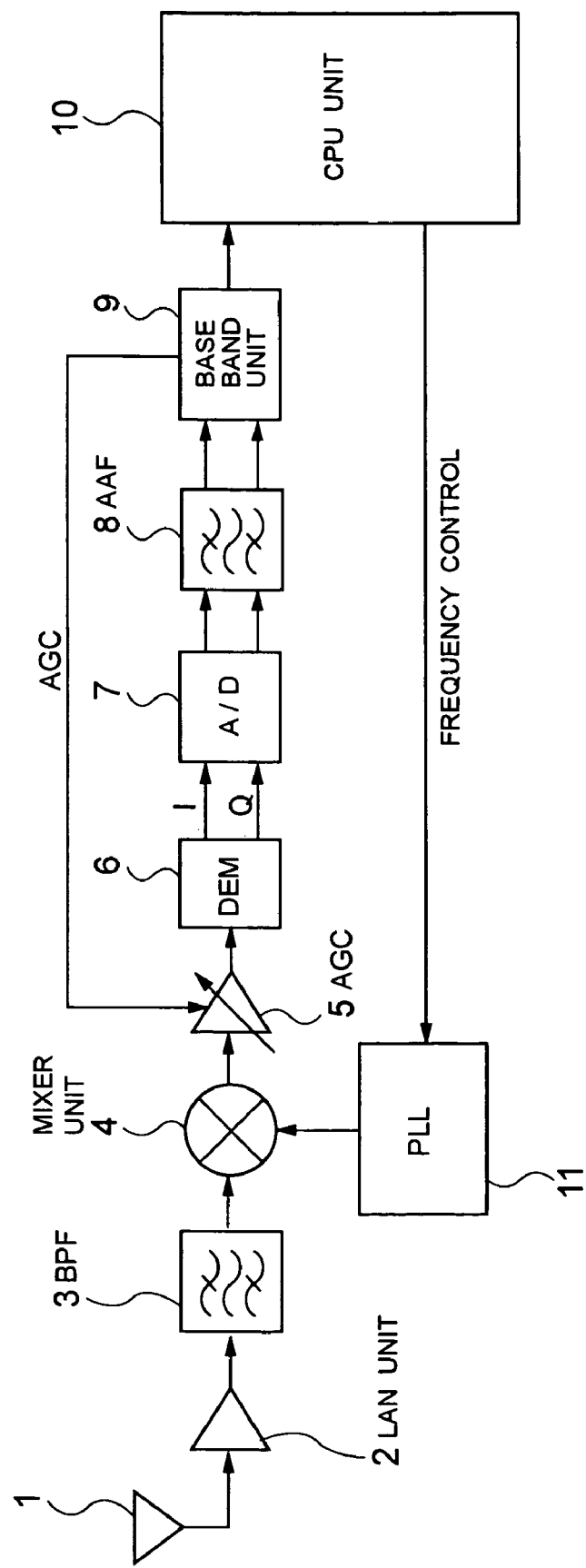
FIG. 1 is a view illustrating a configuration of the reception unit of a mobile terminal according to the first embodiment of the present invention.

FIG. 1 is a view illustrating a configuration of the reception unit of a mobile terminal according to the first embodiment of the present invention. Referring to FIG. 1, the reception unit of a mobile terminal according to the first embodiment of the present invention has an antenna unit 1, a low noise amplifier (LNA) unit 2, a band-pass filter (BPF) unit 3, a mixer unit 4, a variable-gain amplifier unit 5 (AGC), a quadrature demodulator unit (DEM) 6, an A/D converter unit 7, an anti-aliasing filter unit (AAF) 8, a base band unit 9, a CPU unit 10, and PLL (phase-locked loop) synthesizer unit 11.

The PLL synthesizer unit 11 supplies the mixer unit 4 with a local-oscillator signal. In the PLL synthesizer unit 11, the frequency is controlled by the CPU unit 10. In the variable-gain amplifier unit 5, the gain is closed-loop controlled so that the amplitudes of base band signals (I, Q) are constant.

In implementing a cell search, in the first place, the CPU unit 10 of the mobile terminal controls the frequency of the PLL synthesizer unit 11 so that a setting frequency becomes the searching-target frequency. In the second place, the variable-gain amplifier unit 5 is controlled so that the amplitudes of the base band signals are constant. In this situation, the mobile terminal can learn from the controlled gain value of the variable-gain amplifier 5 the level of the received signal (RSSI: Received Signal Strength Indicator). After the gain control of the variable-gain amplifier 5 is completed, the base band unit 9 implements synchronous detection.

The configuration of the reception unit illustrated in FIG. 1 is the same as that of a general wireless receiver; therefore, a detailed explanation for the operation will be omitted.

Next, the operation of the mobile terminal according to the first embodiment of the present invention will be explained with reference to the drawings.

Figure 2:
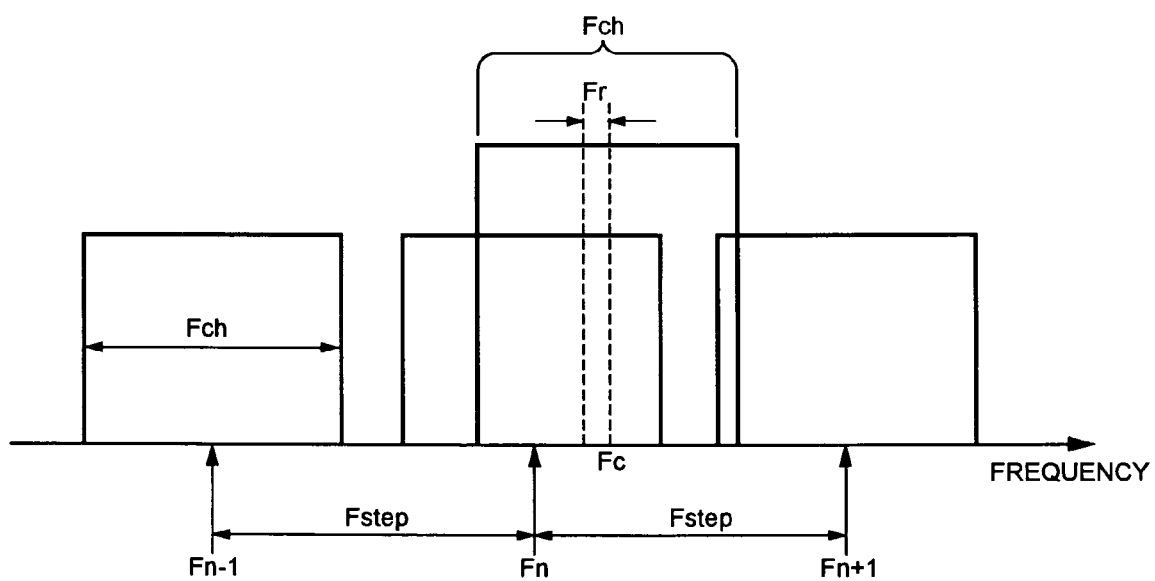
FIG. 2 is a chart for explaining an operational outline of the mobile terminal according to the first embodiment of the present invention.

FIG. 2 is a chart for explaining an operational outline of the mobile terminal according to the first embodiment of the present invention. As represented in FIG. 2, in implementing a cell search, the mobile terminal firstly carries out step-by-step asynchronous detection with a step width Fstep that is same as or twice a bandwidth Fch of a desired signal or in-between, over a predetermined search frequency range that is an entire band range; accordingly, after searching a desired signal, synchronous detection is implemented every channel raster Fr, only in the vicinity of the frequency region where the desired signal exists. As described above, no synchronous detection is implemented in the frequency range where it is determined from the result of the asynchronous detection that no desired signal exists; therefore, a cell-search time is reduced.

Figure 3:
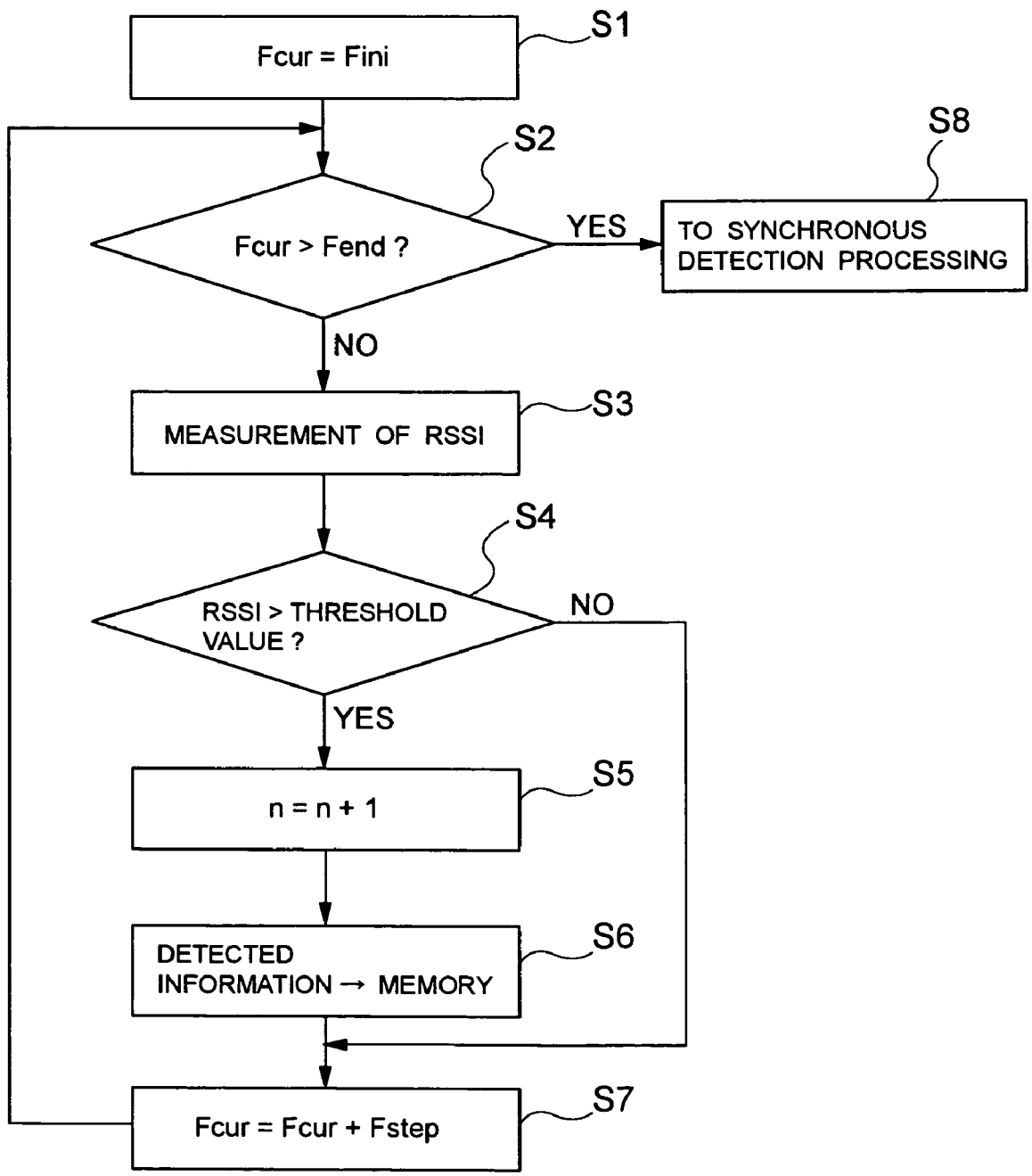
FIG. 3 is a flowchart illustrating asynchronous-detection operation of the mobile terminal according to the first embodiment of the present invention.
Figure 4:
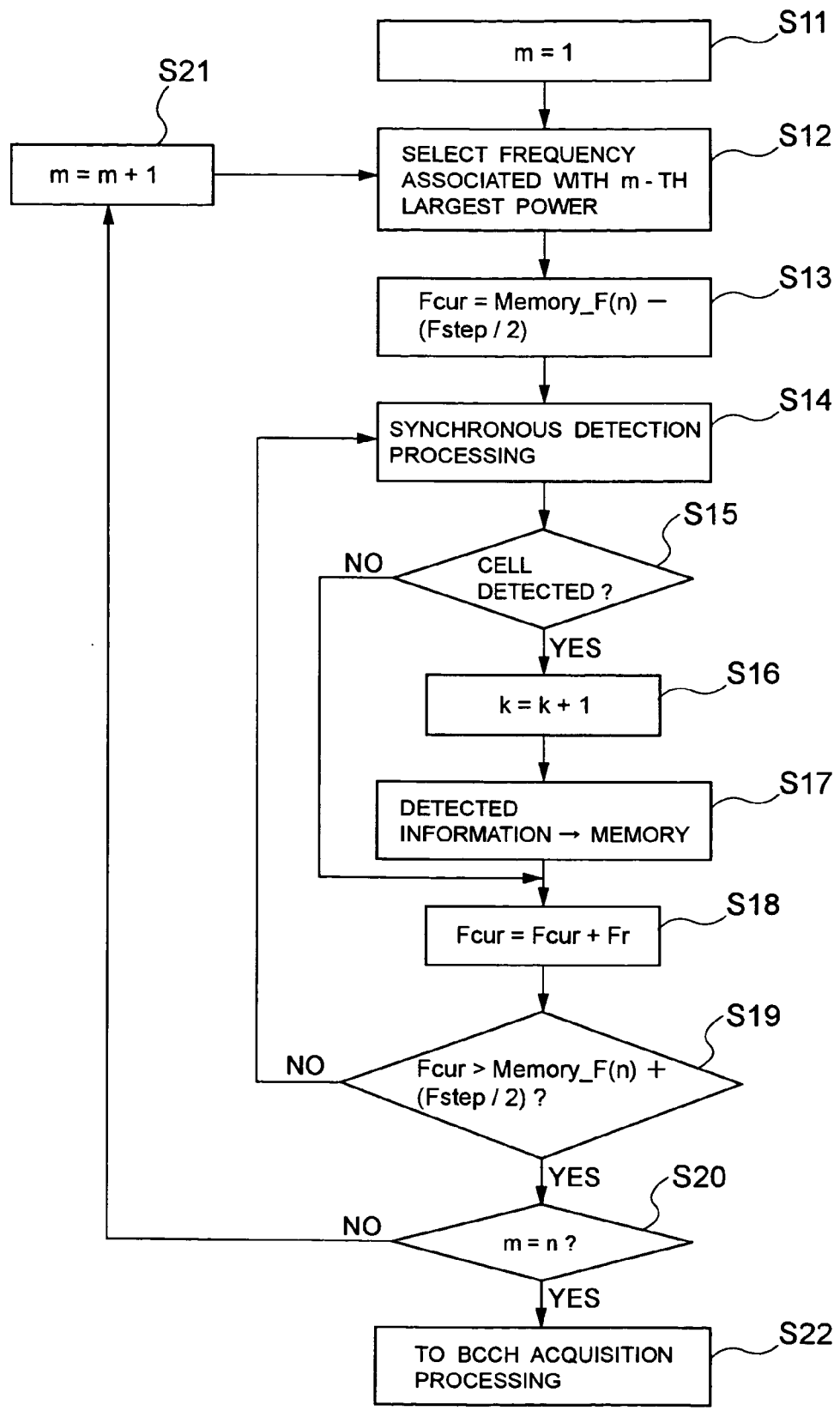
FIG. 4 is a flowchart illustrating synchronous-detection operation of the mobile terminal according to the first embodiment of the present invention.

FIG. 3 is a flowchart illustrating the asynchronous-detection operation of the mobile terminal according to the first embodiment of the present invention; FIG. 4 is a flowchart illustrating the synchronous-detection operation of the mobile terminal according to the first embodiment of the present invention.

In FIG. 3, in implementing a cell search, the CPU unit 10 of the mobile terminal firstly sets an initial frequency Fini (in this case, the lower-limit frequency of the predetermined search frequency range) to a setting frequency Fcur to be asynchronously detected, and then sets the initial frequency Fini in the PLL synthesizer unit 11 (step S1). If the setting frequency Fcur is higher than the upper-limit frequency Fend of the predetermined search frequency range (in the step S2, Yes), the CPU unit 10 proceeds to synchronous detection processing (step S8), i.e., to the flow in FIG. 4.

If the setting frequency Fcur is lower than the upper-limit frequency Fend (in the step S2, No), the level of the received signal (RSSI) is measured at the setting frequency Fcur (step S3). Thereafter, the CPU unit 10 carries out threshold-value determination on the level of the received signal (RSSI); if the level of the received signal (RSSI) is higher than a threshold value (in the step S4, Yes), the setting frequency Fcur is stored as Fn in a memory (not shown), along with the level of the received signal (refer to FIG. 5) (steps S5 and S6). If the level of the received signal (RSSI) is lower than the threshold value (in the step S4, No), the CPU unit 10 proceeds to the step S7, without storing in the memory the setting frequency Fcur and the level of the received signal (RSSI).

In the step S7, the CPU unit 10 returns to the step S2, after changing the setting frequency Fcur by a predetermined step width Fstep. The CPU unit 10 carries out the foregoing operation over the search frequency range (from Fini to Fend), thereby creating an asynchronous-detection detected wave list represented in FIG. 5.

As described above, if the setting frequency Fcur is higher than the upper-limit frequency Fend (in step S2, Yes), the operation proceeds to the flow in FIG. 4. In FIG. 4, the CPU unit 10 firstly sets a parameter m to 1 (step S11), selects the frequency of the received signal having the m-th highest level (RSSI) from the asynchronous-detection detected wave list represented in FIG. 5 (step S12), and sets the setting frequency Fcur to the lower-limit frequency of the frequency range (synchronous-detection frequency range) that has a center frequency of the selected frequency (Memory_F(n)) and a range of the step width Fstep (step S13).

Thereafter, the synchronous detection is implemented (step S14). As a result, if a cell is detected (in the step S15, Yes), the CPU unit 10 stores as Fk in the memory the selected frequency (Memory_F (n)), along with a level of the received electric field (RSCP: Received Signal Code Power), i.e., received power in the CPICH (Common Pilot Channel) (refer to FIG. 6) (steps S16 and S17). If no cell is detected (in the step S15, No), the CPU unit 10 proceeds to the step S18, without storing in the memory the selected frequency (Memory_F(n)) and the level of the received electric field (RSCP: Received Signal Code Power).

In the step S18, the CPU unit 10 changes the setting frequency Fcur by the channel raster Fr, and if the setting frequency Fcur is lower than the upper-limit frequency of the synchronous-detection frequency range described above (in the step S19, No), the CPU unit 10 returns to the step S14; then, the synchronous detection is implemented at the setting frequency Fcur.

In the case where the setting frequency Fcur is higher than the upper-limit frequency of the synchronous-detection frequency range described above (in the step S19, Yes), the CPU unit 10 compares n (the number of frequencies having RSSI higher than the threshold value) with m (the number of frequencies, among n frequencies, to which the synchronous detection has already been applied) (step S20).

If m is not n (in the step S20, No), there is a synchronous-detection frequency range to which the synchronous detection has not been applied; therefore, the CPU unit 10 returns to the step S12 after incrementing the value of m (step S21).

As described above, over respective synchronous-detection frequency ranges that have frequencies described in the asynchronous-detection detected wave list in FIG. 5 as center frequencies and that have a range of the step width Fstep, the synchronous detection is implemented in the order of RSSI, while changing frequency in steps of the channel raster Fr. As a result, a synchronous-detection detected wave list, as represented in FIG. 6, is created.

If m is n, which suggests that the synchronous detection has been completed over all the synchronous-detection frequency ranges (in the step S20, Yes), the CPU unit 10 obtains, based on the synchronous-detection detected wave list in FIG. 6, broadcast information (BCCH: Broadcast Control Channel) of the cell having the highest level of the received electric field (RSCP), and then implements location registration in an appropriate cell (step S22).

Synchronous detection takes a longer time than asynchronous detection does. Additionally, in synchronous detection, a PLL synthesizer is required to be tuned in to the center frequency of a desired signal; therefore, there are many frequencies to be searched. In The first embodiment of the present invention, thanks to implementation of asynchronous detection (measurement of RSSI), synchronous detection is not carried out over the frequency range where no desired signal exists; therefore, the number of frequencies to be searched is reduced, whereby a cell-search time can be shortened. Accordingly, when a mobile terminal travels from a region outside the communication range to a region inside the communication range, location registration can be implemented quicker than conventional registration.

Next, the second embodiment of the present invention will be explained with reference to the drawings. The configuration of a mobile terminal according to the second embodiment of the present invention is the same as that in FIG. 1, and the asynchronous-detection operation of the mobile terminal is also in accordance with the flowchart in FIG. 3; however, the synchronous-detection operation differs from that in the first embodiment.

Assuming that the ratio of the frequency-step width Fstep (refer to FIG. 2) in the case of asynchronous detection to the bandwidth Fch of a desired signal (refer to FIG. 2) is 1, if the setting frequency Fcur falls in the vicinity of the center frequency Fc (refer to FIG. 2) of the desired signal, the number of frequencies to be detected through the asynchronous detection is 1, in the case where the number of desired signals is 1. In contrast, if the setting frequency Fcur falls in the vicinity of the upper-limit frequency, or the lower-limit frequency, of the desired signal having the center frequency Fc and the bandwidth Fch, the number of frequencies to be detected through the asynchronous detection is 2, even when the number of desired signals is 1; in that case, the frequencies are detected in series.

Therefore, by, when frequencies having a level (RSSI) higher than the threshold value are in series detected through the asynchronous detection, setting the starting frequency for the synchronous detection to the middle frequency between the serial frequencies, and by, if frequencies are not detected in series, setting the starting frequency for the synchronous detection to the detected frequency, the cell search through the synchronous detection can be accelerated.

Figure 7:
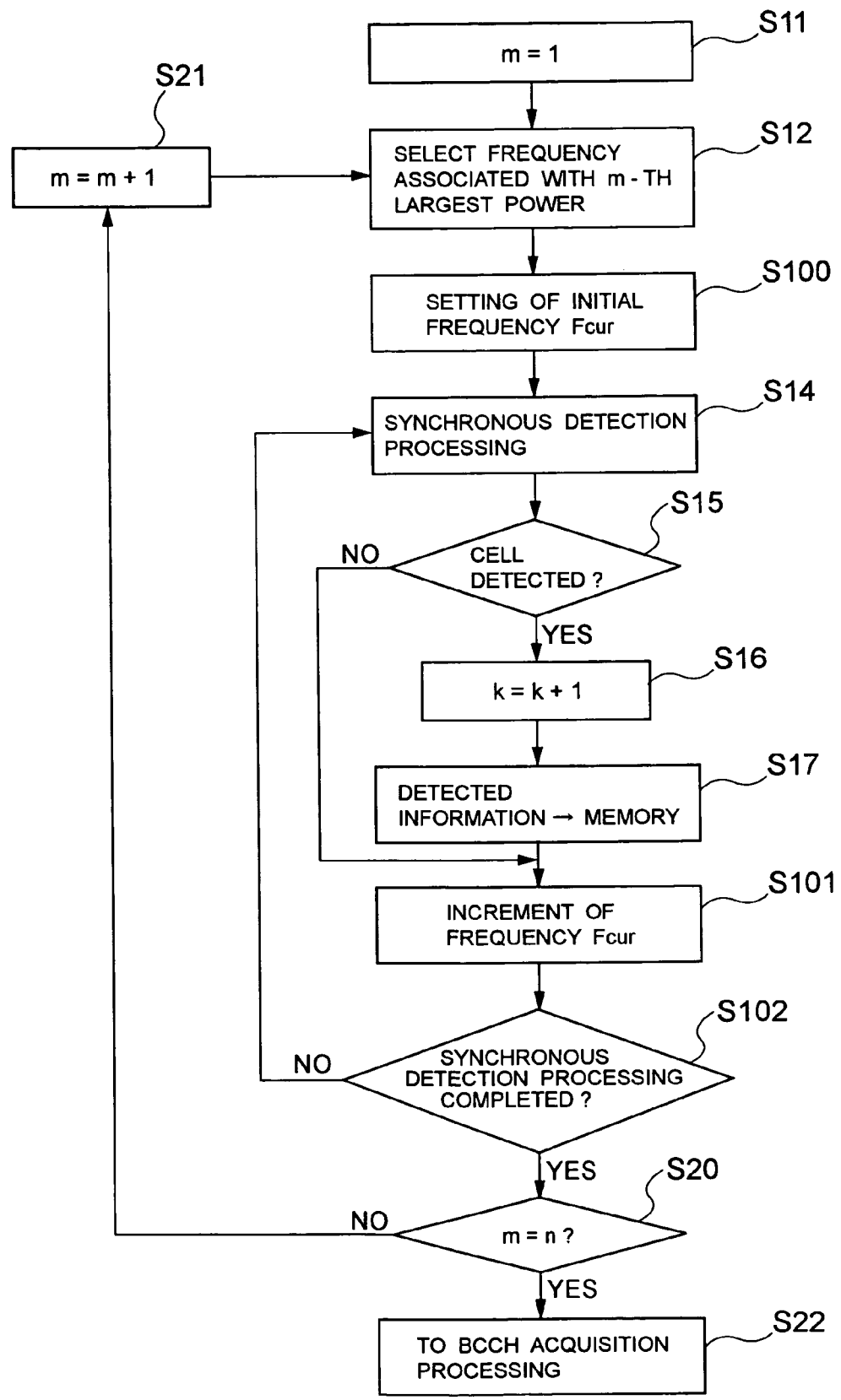
FIG. 7 is a flowchart illustrating synchronous-detection operation of a mobile terminal according to the second embodiment of the present invention.

FIG. 7 is a flowchart illustrating the synchronous-detection operation of the mobile terminal according to The second embodiment of the present invention; the same sections as those in FIG. 4 are indicated by the same reference marks. Referring to FIG. 7, in the step S100, it is determined with which frequency, within the synchronous-detection frequency range having a center frequency that has been selected in the step S12 and the step width Fstep, the synchronous detection is started.

In this situation, letting Fm denote the frequency selected in the step S12, in the case where both frequencies Fm+Fstep and Fm−Fstep have RSSI higher than the threshold value, i.e., in the case where the two frequencies described above are in the list in FIG. 5, the setting frequency Fcur is set in the step S100 to Fm, with which the synchronous detection is started.

Then, in the step S101, the setting frequency Fcur is changed; in this case, the setting frequency Fcur is changed so that the synchronous detection is implemented while the setting frequency Fcur being increased and reduced in steps of the channel raster Fr from the initial value Fm of the setting frequency Fcur. For example, assuming that Fm, Fstep, and Fr are 2140 MHz, 6 MHz, and 200 KHz, respectively, the setting frequency Fcur is changed in the order of 2140 MHz, 2140.2 MHz, 2139.8 MHz, 2140.4 MHz, . . . , 2143 MHz, and 2137 MHz. When the synchronous detection for all of these frequencies has been completed, it is determined in the step S102 that the synchronous-detection processing over the synchronous-detection frequency range has been completed; then, the CPU unit 10 proceeds to the step S20.

In the case where the RSSI at the frequency Fm-Fstep is the same as, or lower than, the threshold value, and the RSSI at the frequency Fm+Fstep is higher than the threshold value, the setting frequency Fcur is set in the step S100 to Fm+Fstep/2, with which the synchronous detection is started.

Then, in this case, the setting frequency Fcur is changed in the step S101 so that the synchronous detection is implemented while the setting frequency Fcur being reduced in steps of the channel raster Fr from the initial value Fm+Fstep/2 of the setting frequency Fcur. For example, assuming that Fm, Fstep, and Fr are 2140 MHz, 6 MHz, and 200 KHz, respectively, the setting frequency Fcur is changed in the order of 2143 MHz, 2142.8 MHz, 2142.6 MHz, . . . , and 2137 MHz. When the synchronous detection for all of these frequencies has been completed, it is determined in the step S102 that the synchronous-detection processing over the synchronous-detection frequency range has been completed; then, the CPU unit 10 proceeds to the step S20.

In the case where the RSSI at the frequency Fm−Fstep is higher than the threshold value, and the RSSI at the frequency Fm+Fstep is the same as, or lower than, the threshold value, the setting frequency Fcur is set in the step S100 to Fm−Fstep/2, with which the synchronous detection is started.

Then, in this case, the setting frequency Fcur is changed in the step S101 so that the synchronous detection is implemented while the setting frequency Fcur being increased in steps of the channel raster Fr from the initial value Fm−Fstep/2 of the setting frequency Fcur. For example, assuming that Fm, Fstep, and Fr are 2140 MHz, 6 MHz, and 200 KHz, respectively, the setting frequency Fcur is changed in the order of 2137 MHz, 2137.2 MHz, 2137.4 MHz, . . . , and 2143 MHz. When the synchronous detection for all of these frequencies has been completed, it is determined in the step S102 that the synchronous-detection processing over the synchronous-detection frequency range has been completed; then, the CPU unit 10 proceeds to the step S20.

In the case where the RSSIs at both frequencies Fm+Fstep and Fm−Fstep are the same as, or lower than, the threshold value, the setting frequency Fcur is set in the step S100 to Fm, with which the synchronous detection is started.

Then, in this case, the setting frequency Fcur is changed in the step S101 so that the synchronous detection is implemented while the setting frequency Fcur being increased and reduced in steps of the channel raster Fr from the initial value Fm of the setting frequency Fcur. For example, assuming that Fm, Fstep, and Fr are 2140 MHz, 6 MHz, and 200 KHz, respectively, the setting frequency Fcur is changed in the order of 2140 MHz, 2140.2 MHz, 2139.8 MHz, 2140.4 MHz, . . . 2143 MHz, and 2137 MHz. When the synchronous detection for all of these frequencies has been completed, it is determined in the step S102 that the synchronous-detection processing over the synchronous-detection frequency range has been completed; then, the CPU unit 10 proceeds to the step S20.

As described above, in the second embodiment of the present invention, by anticipating from the result of asynchronous detection the center frequency Fc of the desired signal, the initial frequency for synchronous detection is determined; therefore, a cell can be quickly detected.

When a cell has been detected at the setting frequency Fcur, no cell exists in the frequency range within ±Fch from this setting frequency Fcur; therefore, the frequency to be searched in synchronous detection can skip Fch. Accordingly, in the flowcharts illustrated in FIGS. 4 and 7, by implementing in the step S14 no synchronous-detection processing for the frequency range within ±Fch from the frequency at which the cell is detected in the step S15, a cell-search time may further be reduced.

In the second embodiment of the present invention, as described above, contrivance of the initial-frequency setting for synchronous detection enables quick cell detection; therefore, by implementing no synchronous-detection processing for the frequency range within ±Fch from the frequency at which a cell is detected, a cell-search time may be reduced more than a cell-search time according the first embodiment.

The processing operation according to each of the flowcharts illustrated in FIGS. 3, 4, and 7 can be realized by making a computer as the CPU (control unit) read out and implement a program preliminarily stored in a storage medium such as a ROM.

What is claimed is:

1. A communication terminal unit comprising:
a controlling means for implementing a cell search, while scanning a predetermined search frequency range, the controlling means comprising:
a measuring means for measuring a received-signal level by
implementing asynchronous detection over the predetermined search frequency range to determined if a desired signal exists in the predetermined search frequency range; and
implementing asynchronous detection in steps of a predetermined frequency step width over the predetermined search frequency range and generating a frequency range that has a center frequency at which the received-signal level is higher than a threshold value and generating a synchronous-detection frequency range that has the predetermined frequency step width; and
detecting a cell by implementing synchronous detection in steps of the predetermined frequency step width over the synchronous-detection frequency range,
wherein the synchronous-detection frequency range over which synchronous detection is to be implemented is adjacent to a synchronous-detection frequency range whose frequency is higher than that of the synchronous-detection frequency range over which synchronous detection is to be implemented, the controlling means starts synchronous detection from the upper-limit frequency of the synchronous-detection frequency range over which synchronous detection is to be implemented.

2. The communication terminal unit according to claim 1, wherein the controlling means measures a received-signal level by implementing asynchronous detection in steps of a predetermined frequency step width over the predetermined search frequency range and makes a frequency range that has a center frequency at which the received-signal level is higher than a threshold value and that has the predetermined frequency step width be the synchronous-detection frequency range.

3. The communication terminal unit according to claim 2, wherein the controlling means detects a cell by implementing synchronous detection in steps of a predetermined frequency step width over the synchronous-detection frequency range.

4. The communication terminal unit according to claim 3, wherein, in the case where the synchronous-detection frequency range over which synchronous detection is to be implemented is adjacent to a synchronous-detection frequency range whose frequency is lower than that of the synchronous-detection frequency range over which synchronous detection is to be implemented, the controlling means starts synchronous detection from the lower-limit frequency of the synchronous-detection frequency range over which synchronous detection is to be implemented; and wherein, in the case where a synchronous-detection frequency range that is adjacent to the synchronous-detection frequency range over which synchronous detection is to be implemented does not exist, and in the case where the synchronous-detection frequency range over which synchronous detection is to be implemented is adjacent to both synchronous-detection frequency ranges whose frequencies are higher and lower than that of the synchronous-detection frequency range over which synchronous detection is to be implemented, the controlling means starts synchronous detection from the center frequency of the synchronous-detection frequency range over which synchronous detection is to be implemented.

5. A cell-search method for a communication terminal unit that implements a cell search, while scanning a predetermined search frequency range, the cell-search method comprising:
a first step of measuring a received-signal level, by implementing asynchronous detection over the predetermined search frequency range to determine if a desired signal exists in the predetermined search frequency range and implementing said asynchronous detection in steps of a predetermined frequency step width over the predetermined search frequency range and generating a frequency range that has a center frequency at which the received-signal level is higher than a threshold value and generating a synchronous-detection frequency range that has the predetermined frequency step width; and
a second step of detecting a cell, by implementing synchronous detection in steps of the predetermined frequency step width over the synchronous-detection frequency range,
wherein the synchronous-detection frequency range over which synchronous detection is to be implemented is adjacent to a synchronous-detection frequency range whose frequency is higher than that of the synchronous-detection frequency range over which synchronous detection is to be implemented, the second step starts synchronous detection from the upper-limit frequency of the synchronous-detection frequency range over which synchronous detection is to be implemented.

6. The cell-search method according to claim 5, wherein, in the first step, a received-signal level is measured, by implementing asynchronous detection in steps of a predetermined frequency step width over the predetermined search frequency range; and wherein, in the second step, a frequency range that has a center frequency at which the received-signal level is higher than a threshold value and that has the predetermined frequency step width is made to be the synchronous-detection frequency range.

7. The cell-search method according to claim 6, wherein, in the second step, a cell is detected, by implementing synchronous detection in steps of a predetermined frequency step width over the synchronous-detection frequency range.

8. The cell-search method according to claim 7, wherein, in the case where the synchronous-detection frequency range over which synchronous detection is to be implemented is adjacent to a synchronous-detection frequency range whose frequency is lower than that of the synchronous-detection frequency range over which synchronous detection is to be implemented, the second step starts synchronous detection from the lower-limit frequency of the synchronous-detection frequency range over which synchronous detection is to be implemented; and wherein, in the case where a synchronous-detection frequency range that is adjacent to the synchronous-detection frequency range over which synchronous detection is to be implemented does not exist, and in the case where the synchronous-detection frequency range over which synchronous detection is to be implemented is adjacent to both synchronous-detection frequency ranges whose frequencies are higher and lower than that of the synchronous-detection frequency range over which synchronous detection is to be implemented, the second step starts synchronous detection from the center frequency of the synchronous-detection frequency range over which synchronous detection is to be implemented.

9. A program storage device readable by a machine, tangibly embodying a program of instructions executable by the machine to perform a cell-search method for a communication terminal unit that implements a cell search, while scanning a predetermined search frequency range, comprising the steps of:

a first step of measuring a received-signal level, by implementing asynchronous detection over the predetermined search frequency range to determine if a desired signal exists in the predetermined search frequency range and implementing asynchronous detection in steps of a predetermined frequency step width over the predetermined search frequency range and generating a frequency range that has a center frequency at which the received-signal level is higher than a threshold value and generating a synchronous-detection frequency range that has the predetermined frequency step width; and a second step of detecting a cell, by implementing synchronous detection in steps of the predetermined frequency step width over the synchronous-detection frequency range wherein the synchronous-detection frequency range over which synchronous detection is to be implemented is adjacent to a synchronous-detection frequency range whose frequency is higher than that of the synchronous-detection frequency range over which synchronous detection is to be implemented, the second step starts synchronous detection from the upper-limit frequency of the synchronous-detection frequency range over which synchronous detection is to be implemented.

10. The program storage device according to claim 9, wherein, in the first step, a received-signal level is measured, by implementing asynchronous detection in steps of a predetermined frequency step width over the predetermined search frequency range;

and wherein, in the second step, a frequency range that has a center frequency at which the received-signal level is higher than a threshold value and that has the predetermined frequency step width is made to be the synchronous-detection frequency range.

* * * * *